(12) United States Patent
Babu et al.

(10) Patent No.: US 11,496,495 B2
(45) Date of Patent: Nov. 8, 2022

(54) SYSTEM AND A METHOD FOR DETECTING ANOMALOUS PATTERNS IN A NETWORK

(71) Applicant: Cognizant Technology Solutions India Pvt. Ltd, Chennai (IN)

(72) Inventors: Lakshmanan Babu, Chennai (IN); Vinoth Selvaraj, Thanjavur (IN); Srihari Viswanathan, Tirupur (IN); Rohith Cheriakallil, Kerala (IN); Keerthika Dasarathan, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 467 days.

(21) Appl. No.: 16/727,012

(22) Filed: Dec. 26, 2019

(65) Prior Publication Data

US 2021/0126931 A1    Apr. 29, 2021

(30) Foreign Application Priority Data

Oct. 25, 2019    (IN) .............................. 201941043497

(51) Int. Cl.
*H04L 9/40* (2022.01)
*G06F 16/28* (2019.01)
*G06N 3/08* (2006.01)

(52) U.S. Cl.
CPC ........ *H04L 63/1425* (2013.01); *G06F 16/285* (2019.01); *G06N 3/08* (2013.01)

(58) Field of Classification Search
None
See application file for complete search history.

(56) References Cited

U.S. PATENT DOCUMENTS

| | | | |
|---|---|---|---|
| 8,504,504 B2 | 8/2013 | Liu | |
| 9,195,829 B1* | 11/2015 | Goradia | ................... G06F 21/55 |
| 9,661,019 B2 | 5/2017 | Liu | |
| 10,237,289 B2* | 3/2019 | Du | ....................... H04L 63/1416 |
| 10,425,912 B1* | 9/2019 | Mukherji | ............... H04W 4/029 |
| 10,692,004 B1* | 6/2020 | Segev | ...................... G06Q 10/20 |
| 10,769,658 B2* | 9/2020 | Carlough | ........... G06Q 30/0246 |

(Continued)

FOREIGN PATENT DOCUMENTS

| | | |
|---|---|---|
| CN | 106789837 A | 5/2017 |
| KR | 20140014784 A | 2/2014 |

*Primary Examiner* — Dant B Shaifer Harriman
*Assistant Examiner* — Mahabub S Ahmed
(74) *Attorney, Agent, or Firm* — Cantor Colburn LLP (57) ABSTRACT

The present invention discloses a system and a method for detecting anomalous patterns in a network such as a LAN, WAN, MAN, internet of things (Iot), cloud networks, or any other network. In operation, the system and method of the present invention determines a generic pattern of behavior associated with a plurality of anomaly classes based on a plurality of feature values using reinforcement learning technique. The generic pattern is fixed as a boundary for each of the plurality of anomaly classes and is representative of behavior which substantially simulates the network behavior on attack by any of the plurality of anomaly classes. Further, the present invention, provides for updating the generic pattern using reinforcement learning. The updated generic pattern is implemented to analyze and detect anomalous behavior in the incoming network traffic in real time.

20 Claims, 6 Drawing Sheets

(56) References Cited

U.S. PATENT DOCUMENTS

| | | | |
|---|---|---|---|
| 10,771,313 B2* | 9/2020 | Tedaldi | H04L 41/5025 |
| 10,812,515 B1* | 10/2020 | Segev | H04L 63/145 |
| 10,915,631 B2* | 2/2021 | Chen | G06N 3/08 |
| 2006/0037077 A1* | 2/2006 | Gadde | H04L 63/1416 726/23 |
| 2006/0107321 A1* | 5/2006 | Tzadikario | H04L 63/1425 726/22 |
| 2007/0294187 A1* | 12/2007 | Scherrer | H04L 63/1425 705/75 |
| 2008/0109730 A1* | 5/2008 | Coffman | G06Q 30/02 715/733 |
| 2009/0119242 A1* | 5/2009 | Vargas Martin | G06N 20/00 709/224 |
| 2010/0115621 A1* | 5/2010 | Staniford | H04L 63/1416 726/25 |
| 2010/0153316 A1* | 6/2010 | Duffield | H04L 41/00 706/47 |
| 2013/0104236 A1* | 4/2013 | Ray | H04L 63/1408 726/25 |
| 2013/0227691 A1* | 8/2013 | Aziz | H04L 63/145 726/24 |
| 2014/0081652 A1* | 3/2014 | Klindworth | G06Q 10/0635 705/2 |
| 2014/0165207 A1* | 6/2014 | Engel | H04L 41/069 726/25 |
| 2016/0036844 A1* | 2/2016 | Kopp | G06N 5/045 726/1 |
| 2016/0234167 A1* | 8/2016 | Engel | H04L 63/1408 |
| 2017/0116059 A1* | 4/2017 | Wolf | G06F 11/0772 |
| 2017/0279830 A1 | 9/2017 | Mermond | |
| 2017/0279834 A1 | 9/2017 | Vasseur | |
| 2017/0316342 A1* | 11/2017 | Franc | G06N 20/10 |
| 2017/0339022 A1* | 11/2017 | Hegde | H04L 41/142 |
| 2018/0013776 A1 | 1/2018 | Gay | |
| 2018/0063168 A1* | 3/2018 | Sofka | G06N 3/0454 |
| 2018/0248895 A1* | 8/2018 | Watson | G06Q 20/4016 |
| 2019/0042745 A1* | 2/2019 | Chen | G06F 21/566 |
| 2019/0098039 A1* | 3/2019 | Gates | G06F 21/6245 |
| 2019/0171438 A1* | 6/2019 | Franchitti | G06N 20/00 |
| 2019/0245876 A1* | 8/2019 | Faigon | G06F 21/6209 |
| 2019/0253442 A1* | 8/2019 | Brabec | H04L 63/1425 |
| 2019/0340392 A1* | 11/2019 | Khorrami | G06F 11/3612 |
| 2020/0112572 A1* | 4/2020 | Ajayi | H04L 63/1425 |
| 2020/0195672 A1* | 6/2020 | Mugambi | H04L 69/22 |
| 2020/0267171 A1* | 8/2020 | Mozumdar | G06F 13/4282 |
| 2020/0285997 A1* | 9/2020 | Bhattacharyya | G06N 7/00 |
| 2020/0303071 A1* | 9/2020 | Miller | G16H 50/70 |
| 2021/0021621 A1* | 1/2021 | Janaki | H04L 41/142 |
| 2021/0026725 A1* | 1/2021 | Roy | G06Q 10/20 |
| 2021/0034994 A1* | 2/2021 | Stocker | G06N 5/04 |
| 2021/0092138 A1* | 3/2021 | Clark | H04L 63/1425 |

* cited by examiner

FIG. 1

| Category | First Collection of one or more datasets Network Files(pcap) | Second Collection of one or more datasets Network Files(pcap) |
|---|---|---|
| Normal | 750 | 357 |
| Adware | 841 | 360 |
| DDoS | 1372 | 598 |
| Ransomware | 1436 | 616 |

FIG. 1A

| User Name | Monitor duration | User Role | User Rules | User working time (IST) | Divided Zones for Analysis | Holiday List |
|---|---|---|---|---|---|---|
| Centos | Jan,2018 to Dec,2018 | Had sudo access | won't work on weekends and holidays | 8:00AM – 6:00PM | Zone_1= 0:00AM to 08:00AM, Zone_2= 08:01AM to 12:00PM, Zone_3 = 12:01PM to 14:00PM, Zone_4 = 14:01PM to 18:00PM, Zone_5 = 18:01PM to 23:59PM | 01 Jan 2018, 15 Jan 2018, 26 Jan 2018, 01 May 2018, 15 Jun 2018, 15 Aug 2018, 02 Oct 2018, 18 Oct 2018, 06 Nov 2018, 25 Dec 2018 |

FIG. 1B

| FEATURE TYPE | FEATURES | |
|---|---|---|
| Network | Probability Distribution<br>Levy_loc, Levy_scale, Cauchy_loc, Cauchy_scale, Pareto_shape, Pareto_scale1, Pareto_scale2, Weibull_shape, Weibull_scale, Weibull_loc, LogNormal_mean, LogNormal_shape, LogNormal_variance<br><br>Network Traffic<br>window_advertisement_value, roundtriptime, http_methods, retransmission, noDNSres, unreachICMP, tcpFINset, idletim, uris, botfor, tcpPSHset | |
| User Analytics | user_date, user_id, user_day, isWeekDay, isHoliDay, zone_1_count, zone_2_count, zone_3_count, zone_4_count, zone_5_count, total_terminal_used_count, total_ipaddress_count, avg_session_terminal_time | |

SYSTEM AND A METHOD FOR DETECTING ANOMALOUS PATTERNS IN A NETWORK

CROSS REFERENCE TO RELATED APPLICATION

This application is related to and claims the benefit of Indian Patent Application Number 201941043497 filed on Oct. 25, 2019, the contents of which are herein incorporated by reference in their entirety.

FIELD OF THE INVENTION

The present invention relates generally to the field of cyber security. More particularly, the present invention relates to a system and a method for detecting anomalies in a network based on patterns of network behavior and patterns of network user behavior.

BACKGROUND OF THE INVENTION

Anomaly detection systems are in existence from nearly two decades and are essential for identifying security threats in a network by assessing network's behavior or user behavior. In general, anomaly detection systems monitor data moving across the network to identify patterns of network behavior that deviates from the pattern of normal network behavior. Anomalous pattern may or may not be an attack, however it may be categorised as a behaviour which was previously unknown. An example of anomalous network behaviour may be a sudden increase in traffic volume at a specific host that does not usually receive a high volume of traffic. Another example of anomalous behaviour is a distinct network usage pattern of a specific user operating on the network.

Conventional anomaly detection systems as discussed above are developed based on supervised and unsupervised machine learning techniques. Anomaly detection systems based on supervised learning techniques are trained using labeled examples of normal and anomalous datasets. The trained system classifies the incoming dataset associated with network or user behavior into normal or anomaly class based on the labeled examples. Anomaly detection systems based on unsupervised learning are trained to detect anomalies in an unlabeled dataset by forming clusters based on commonality in each cluster. During testing, said anomaly detection systems map the cluster associated with incoming dataset to a specific clusters having closest similarity. The anomaly detection systems based on supervised learning and unsupervised learning are continually challenged by the sophisticated intrusions and attacks. Said systems suffer from one or more disadvantages such as dataset constraints, high computation time, complexity, reduced accuracy, inadequate decision making, and ambiguity in analyzing patterns. Consequently, the conventional anomaly detection systems are unable to detect such attacks. Additionally, the conventional anomaly detection systems are trained based on historic data and are unable to identify new type of attacks also known as zero-day attacks.

In light of the above drawbacks, there is a need for a system and a method which can effectively detect anomalies in a network. There is a need for a system and a method which can identify new attack patterns having no specific signature and minimize user intervention. Further, there is a need for a system and a method which is self-learning and improves with time. Furthermore, there is a need for a system and a method which is accurate and reduces computation time. Yet further, there is a need for a system which can be easily implemented.

SUMMARY OF THE INVENTION

In various embodiments of the present invention, a method for detecting anomalous behavior patterns in a network is provided. The method is implemented by at least one processor executing program instructions stored in a memory. The method comprising extracting a plurality of feature values associated with predetermined features from a first collection of one or more datasets associated with a plurality of anomaly classes. The predetermined features are individual measurable characteristics of network behavior and user behavior in the presence or absence of an anomaly. The method further comprises determining a generic pattern of behavior associated with the plurality of anomaly classes based on the extracted feature values. The generic pattern is representative of behavior which substantially simulates feature values on attack by any of the plurality of anomaly classes. Further, the method comprises updating the determined generic pattern based on the analysis of performance of the determined generic pattern based on a second collection of one or more datasets associated with the plurality of anomaly classes and normal behavior classes. Finally, the method comprises detecting anomalous behavior pattern in a real-time traffic based on the updated generic pattern.

In various embodiments of the present invention, a system for detecting anomalous behavior patterns in a network is provided. The system comprises a memory storing program instructions, a processor configured to execute program instructions stored in the memory, and an anomaly detection engine in communication with the processor. The system configured to extract a plurality of feature values associated with predetermined features from a first collection of one or more datasets associated with a plurality of anomaly classes. The predetermined features are individual measurable characteristics of network behavior and user behavior in the presence or absence of an anomaly. Further, the system is configured to determine a generic pattern of behavior associated with the plurality of anomaly classes based on the extracted feature values. The generic pattern is representative of behavior which substantially simulates feature values on attack by any of the plurality of anomaly classes. Furthermore, the system is configured to update the determined generic pattern based on the analysis of performance of the determined generic pattern based on a second collection of one or more datasets associated with the plurality of anomaly classes and normal behavior classes. Yet further, the system is configured to detect anomalous behavior pattern in real-time traffic based on the updated generic pattern.

In various embodiments of the present invention, a computer program product is provided. The computer program product comprises a non-transitory computer-readable medium having computer-readable program code stored thereon, the computer-readable program code comprising instructions that, when executed by a processor, cause the processor to extract a plurality of feature values associated with predetermined features from a first collection of one or more datasets associated with a plurality of anomaly classes. The predetermined features are individual measurable characteristics of network behavior and user behavior in the presence or absence of an anomaly. Further, a generic pattern of behavior associated with the plurality of anomaly classes is determined based on the extracted feature values.

The generic pattern is representative of behavior which substantially simulates feature values on attack by any of the plurality of anomaly classes. Furthermore, the determined generic pattern is updated based on the analysis of performance of the determined generic pattern based on a second collection of one or more datasets associated with the plurality of anomaly classes and normal behavior classes. Finally, anomalous behavior pattern is detected in real-time traffic based on the updated generic pattern.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for detecting anomalous patterns in a network. Examples of a network may include, but are not limited to, LAN, WAN, MAN, internet of things (Iot), cloud networks, or any other centralized or distributed network. In operation, the system and the method of the present invention determines a generic pattern of behavior associated with a plurality of anomaly classes based on a plurality of feature values using reinforcement learning technique. The plurality of feature values are extracted from a first collection of one or more datasets associated with each of the plurality of anomaly classes. The generic pattern is fixed as a boundary for each of the plurality of anomaly classes and is representative of behavior which substantially simulates the network behavior on attack by any of the plurality of anomaly classes. Further, the present invention, provides for updating the generic pattern based on a second collection of one or more datasets using reinforcement learning. The first collection of one or more datasets and the second collection of one or more datasets comprises heterogeneous data capable of simulating real-time traffic associated with each of the plurality of anomaly classes and normal behavior classes. The system and method of the present invention, implements the updated generic pattern and analyses the incoming network traffic in real time to detect anomalous behavior in the network.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. The term inventory as used in the specification refers to items including, but not limited to, raw materials, unfinished goods, finished merchandise etc.

The present invention would now be discussed in context of embodiments as illustrated in the accompanying drawings.

Figure 1:
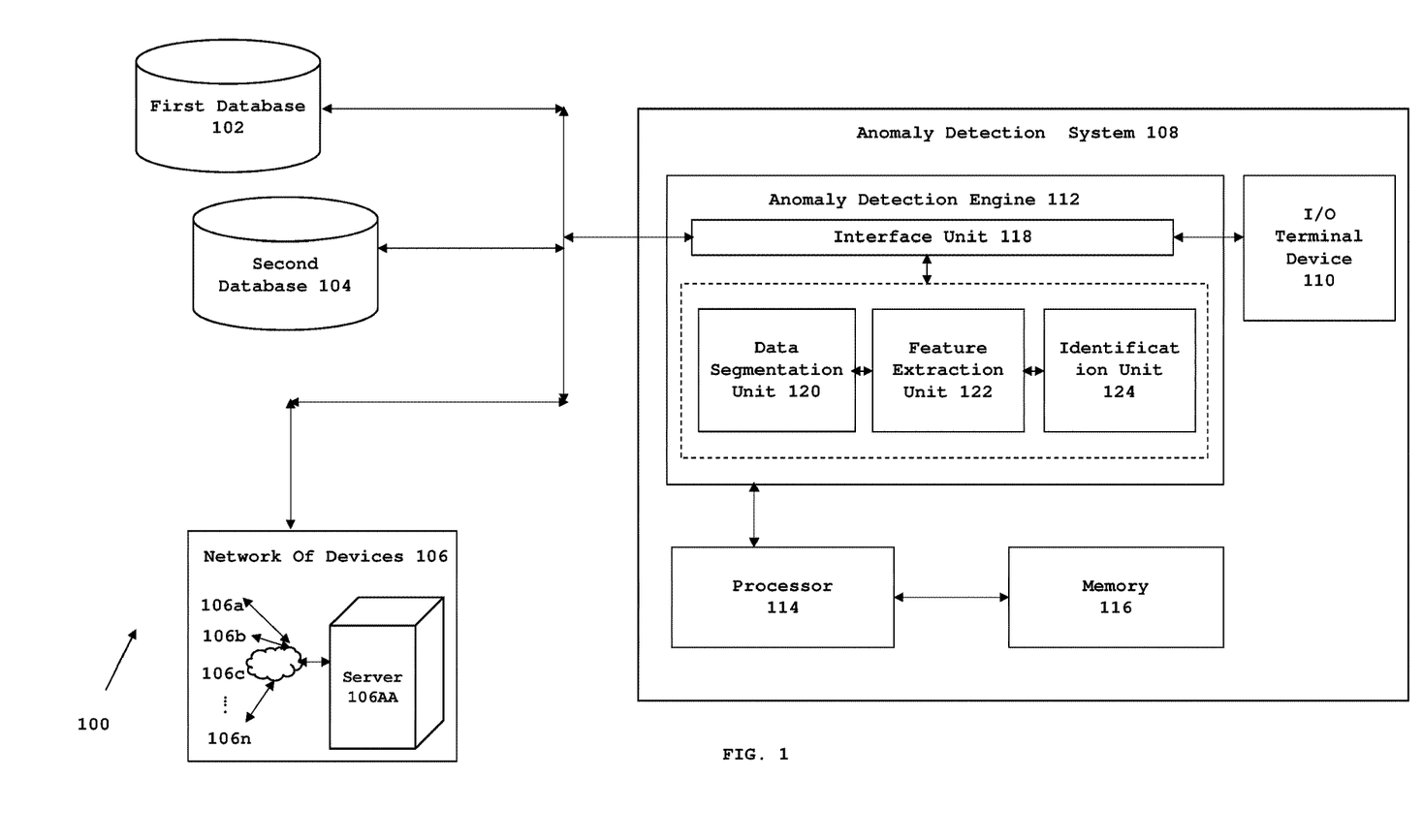
FIG. 1 illustrates a detailed block diagram of a system for detecting anomalous behavior patterns in a network, in accordance with an embodiment of the present invention.

FIG. 1 illustrates a detailed block diagram of a system for detecting anomalous behavior patterns in a network, in accordance with an embodiment of the present invention. Referring to FIG. 1, in an embodiment of the present invention, an environment 100 for a system for detecting anomalous behavior patterns in a network is illustrated. In various embodiments of the present invention, the environment 100 comprises a first database 102, a second database 104, a network of devices 106 and a system for detecting anomalous patterns in a network, hereinafter referred to as anomaly detection system 108.

In an embodiment of the present invention, the first database 102 and the second database 104 may be maintained in one or more storage servers capable of maintaining and updating data for a predetermined period of time. In an exemplary embodiment of the present invention, the first database 102 and the second database 104 may be maintained in the same storage server. The one or more storage servers may be maintained at a location remote to the anomaly detection system 108. In another exemplary embodiment of the present invention, the first database 102 and the second database 104 may be Hadoop Distributed File System (HDFS). The first database 102 includes a first collection of one or more datasets associated with each of the plurality of anomaly classes. The second database 104 includes a second collection of one or more datasets associated with each of the plurality of anomaly classes. The first collection of one or more datasets and the second collection of one or more datasets comprises heterogeneous data capable of simulating real traffic associated with each of the plurality of anomaly classes and normal behavior classes. The normal behavior class is representative of data associated with normal network traffic and normal user behavior.

Figure 1A:
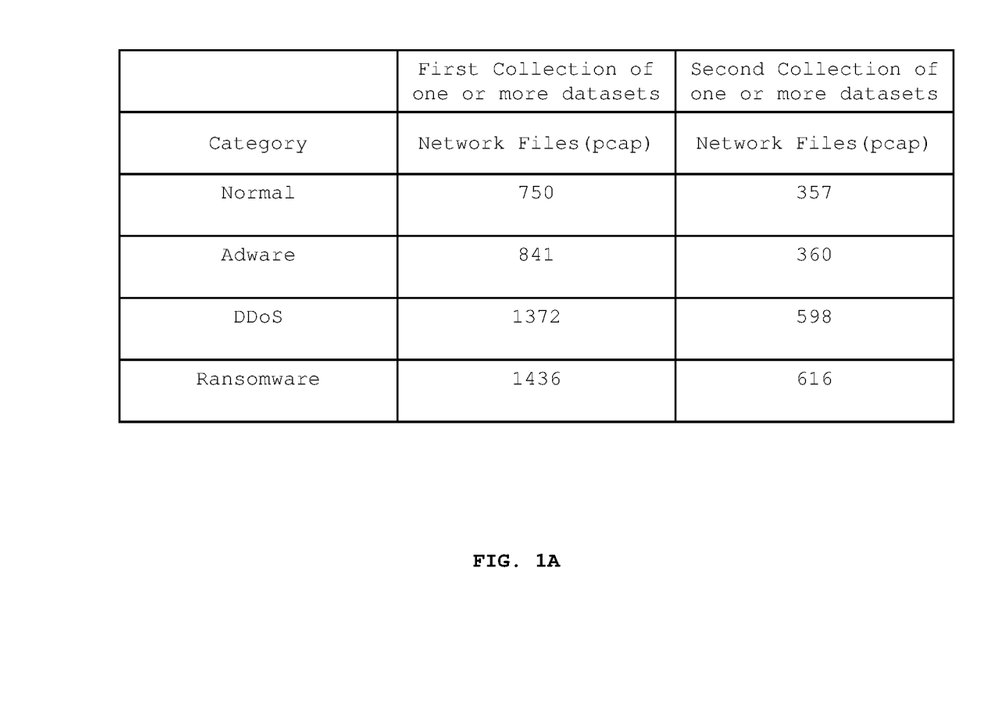
FIG. 1A is an exemplary table listing a number of network files associated with respective anomaly classes, in accordance with an embodiment of the present invention.
Figure 1B:
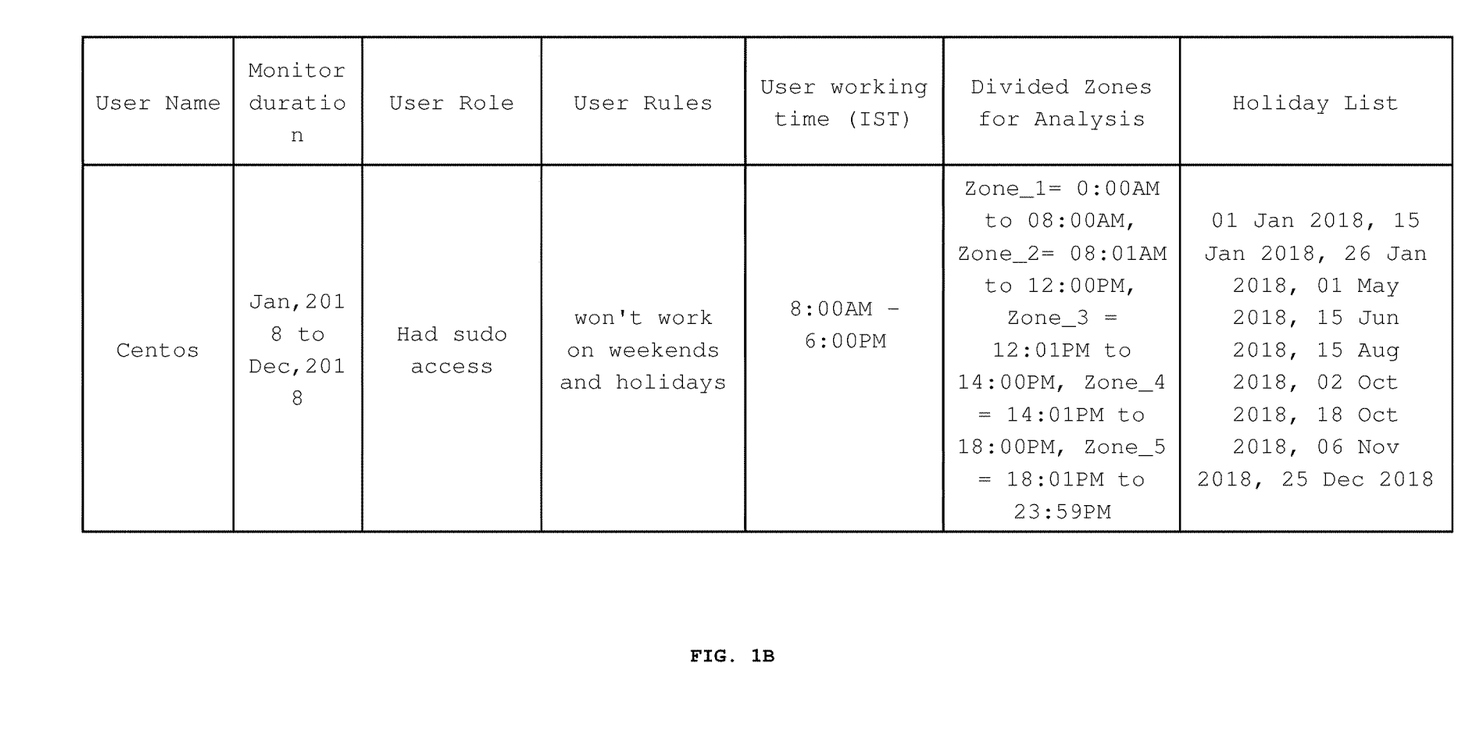
FIG. 1B is an exemplary user log, in accordance with an embodiment of the present invention.

In an embodiment of the present invention, the plurality of anomaly classes are categorized into network anomaly and user behavior anomaly. Examples of network anomaly may include, but are not limited to, adware, ransomware, spam ware, distributed denial-of-service (DDoS) attack, botnet, spyware, and exploit kit. The datasets associated with network anomalies and normal network traffic are collected in the form of network packets. In an exemplary embodiment of the present invention, the network packets are stored in a packet capture file format (pcap) in the first database 102 and the second database 104. Each of first collection of one or more datasets and the second collection of one or more datasets includes a plurality of pcap files associated with respective anomalies. An exemplary table listing the number of network files associated with respective anomaly classes is shown in FIG. 1A, in accordance with an embodiment of the present invention. In various embodiments of the present invention, the user behavior anomaly is representative of distinct network usage patterns such as excessive login time, unknown login location, login authentication attempts, user role etc. pertaining to any user in the network. The datasets associated with user behavior anomaly and normal user behavior are collected by monitoring user activities in the network and are maintained in the form of user logs and audit reports. An exemplary user log is shown in FIG. 1B, in accordance with an embodiment of the present invention.

In an embodiment of the present invention, the one or more servers associated with the first database 102 and the second database 104 are configured to collect datasets associated with each of the plurality of anomaly classes and normal behavior classes from a plurality of devices (not shown) connected in a network (not shown). Examples of devices may include, but are not limited to computers, smartphones, or any other device capable of executing instructions and transmitting/receiving data. Examples of network may include, but are not limited to internet of things (Iot), cloud networks, a Local Area Network (LAN), a Metropolitan Area Network (MAN), and a Wide Area Network (WAN) or any other centralized or decentralized network. In an exemplary embodiment of the present invention, each of the plurality of devices are configured with user activity monitoring tools such as Syslog-ng and Journald for collecting user logs.

In various embodiments of the present invention, the first database 102 and the second database 104 are configured to interface with the anomaly detection system 108. In an exemplary embodiment of the present invention, the first database 102 and the second database 104 may be accessed through a web address by the anomaly detection system 108.

In various embodiments of the present invention, the network of devices 106 may be a centralized network, decentralized network or a combination of centralized and decentralized network. In an embodiment of the present invention as shown in FIG. 1, the network of devices 106 is a centralized network including a server 106AA and a plurality of devices 106a, 106b, 106c . . . 106n connected via a first communication channel (not shown). Examples of devices may include, but are not limited to computers, smartphones, or any other device capable of executing instructions and transmitting/receiving data. The server 106AA is configured to collect datasets associated with incoming traffic. The datasets associated with user behavior anomaly are collected by the devices 106a, 106b, 106c, . . . 106n by monitoring user activities in the network. In an exemplary embodiment of the present invention, each of the plurality of devices 106a, 106b, 106c . . . 106n are configured with user activity monitoring tools such as Syslog-ng and Journald for collecting user logs and audit reports. Examples of the communication channel may include, but are not limited to, an interface such as a software interface, a physical transmission medium, such as, a wire, or a logical connection over a multiplexed medium, such as, a radio channel in telecommunications and computer networking. Examples of radio channel in telecommunications and computer networking may include, but are not limited to, RFID, Bluetooth, a Local Area Network (LAN), a Metropolitan Area Network (MAN), and a Wide Area Network (WAN). In an embodiment of the present invention, the network of devices 106 is configured to interface with the anomaly detection system 108.

In various embodiments of the present invention, the anomaly detection system 108 may be a hardware, software or a combination of hardware and software. In an embodiment of the present invention as shown in FIG. 1, the anomaly detection system 108 is a combination of hardware and software. The anomaly detection system 108 is configured to interface with the first database 102 and the second database 104 to retrieve the first collection of one or more datasets and the second collection of one or more datasets, respectively over a second communication channel (not shown). In an embodiment of the present invention, the anomaly detection system 108 is configured to interface with the network of devices 106 to receive network traffic in real time over a third communication channel (not shown). Examples of the second communication channel and the third communication channel may include, but are not limited to, an interface such as a software interface, a physical transmission medium, such as, a wire, or a logical connection over a multiplexed medium, such as, a radio channel in telecommunications and computer networking. Examples of radio channel in telecommunications and computer networking may include, but are not limited to, a Local Area Network (LAN), a Metropolitan Area Network (MAN), and a Wide Area Network (WAN). In another embodiment of the present invention, the anomaly detection system 108 may be a software component integrated with the network of devices 106. In particular, the anomaly detection system 108 may be integrated with the server 106AA.

In another embodiment of the present invention, the anomaly detection system 108 may be implemented as a client-server architecture, wherein a network administrator accesses a server hosting the anomaly detection system 108 over a communication channel (not shown).

In yet another embodiment of the present invention, the anomaly detection system 108 may be implemented in a cloud computing architecture in which data, applications, services, and other resources are stored and delivered through shared data-centers. In an exemplary embodiment of the present invention, the functionalities of the anomaly detection system 108 are delivered as software as a service (SAAS).

In an embodiment of the present invention as shown in FIG. 1, the anomaly detection system 108 comprises an input/output (I/O) terminal device 110, an anomaly detection engine 112, a processor 114 and a memory 116. The anomaly detection engine 112 is operated via the processor 114 specifically programmed to execute instructions stored in the memory 116 for executing functionalities of the system 108 in accordance with various embodiments of the present invention. Examples of the input/output (I/O) terminal device 110 may include, but are not limited to, a touchscreen display, a keyboard and a display combination or any other wired or wireless device capable of receiving inputs and displaying output results.

In various embodiments of the present invention, the anomaly detection engine 112 is a self-learning engine configured to receive complex datasets, analyze datasets, extract features associated with a plurality of anomaly classes, develop a generic pattern of network behavior associated with the plurality of anomaly classes, update the generic pattern and detect anomalies in the incoming real-time network traffic.

In various embodiments of the present invention, the anomaly detection engine 112 has multiple units which work in conjunction with each other for detecting anomalous patterns in a network. The various units of the anomaly detection engine 112 are operated via the processor 114 specifically programmed to execute instructions stored in the memory 116 for executing respective functionalities of the multiple units in accordance with various embodiments of the present invention. In an embodiment of the present invention, the memory 116 may be divided into random access memory (RAM) and Read-only memory (ROM). In an exemplary embodiment of the present invention, the memory 116 comprises a RAM ranging from 4 Gigabytes (GB) to 16 GB, and a ROM ranging from 250 GB to 1 Terabyte (TB). In an embodiment of the present invention, the anomaly detection engine 112 comprises an interface unit 118, a data segmentation unit 120, a feature extraction unit 122 and an identification unit 124.

The interface unit 118 is configured to interact with the first database 102, the second database 104, the network of devices 106 and the I/O terminal device 110. The interface unit 118 is configured to interface with the first database 102 and the second database 104 to retrieve the first collection of one or more datasets and the second collection of one or more datasets, respectively. Further, the interface unit 118 is configured to interface with the network of devices 106 to receive network traffic in real time over a third communication channel (not shown). In an embodiment of the present invention, the interface unit 118 interacts with the I/O terminal device 110 to receive one or more inputs from users and transmit results.

In an embodiment of the present invention, the data segmentation unit 120 is configured to retrieve first collection of one or more datasets from the first database 102 via the interface unit 118. The data segmentation unit 120 is configured to retrieve second collection of one or more datasets from the second database 104 via the interface unit 118. The data segmentation unit 120 is configured to refine the retrieved first collection of one or more datasets and the second collection of datasets using a first set of rules. In an embodiment of the present invention, the first set of rules comprises categorizing a plurality of files included in the (first) collection of one or more datasets into network traffic files (pcap files) and user behavior files. The network traffic files include data associated with network anomaly class and normal traffic class. The user behavior files include data associated with user behavior anomalies and normal user behavior. The first set of rules further comprises segmenting each of categorized datasets. In particular, the network traffic files and the user behavior files are segmented into small chunks based on time of collection of data within the files. The segmentation is done using one or more techniques such as Long-Short-Term memory (LSTM) technique. In an exemplary embodiment of the present invention, where the network traffic files are pcap files, said pcap files are segmented into small chunks of network packets based on time of collection of the network packets. The user behavior files are segmented into small chunks of user logs based on the time of collection user logs. The first set of rules further includes removing improper datasets from the segmented datasets. In an exemplary embodiment of the present invention, improper dataset is a dataset without any metadata. In operation each network file and each user behavior file is processed to remove improper data associated with each network traffic file and each user behavior file. In particular, improper network packets and improper user logs are removed. Finally, the first set of rules includes, arranging each of the proper network packets and the proper user logs in chronological order.

Figure 1C:
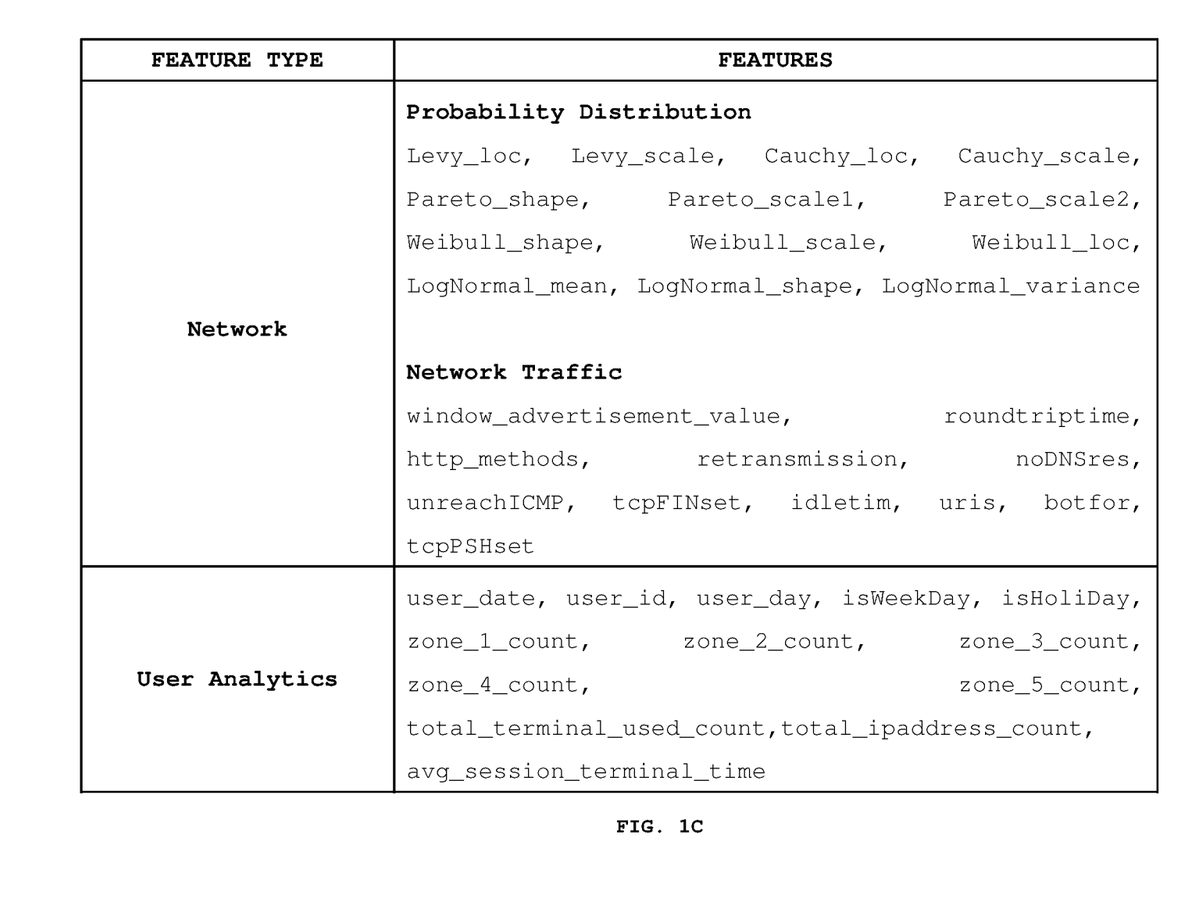
FIG. 1C is an exemplary table of various features extracted for network anomalies and user anomalies, in accordance with an embodiment of the present invention.

In an embodiment of the present invention, the feature extraction unit 122 is configured to receive the refined first collection of one or more datasets from the data segmentation unit 120. The feature extraction unit 122 is configured to extract a plurality of feature values from the refined first collection of one or more datasets associated with each of the plurality of anomaly classes. In an embodiment of the present invention, the features to be extracted are predetermined based on statistical analysis of network behavior in the presence and absence of network anomalies. In an embodiment of the present invention, a predetermined features are an individual measurable characteristics of network behavior and user behavior in the presence or absence of an anomaly. In particular, the feature extraction unit 122 is configured to extract features from respective network files associated with at least one of: network anomaly class or a normal traffic class. The feature extraction unit 122 extracts the features associated with network anomaly class and the features associated with user anomaly class from the refined datasets using one or more techniques. In operation, the feature extraction unit 122 extracts the plurality of feature values from each of the refined network packets associated with at least one of: network anomaly class or a normal traffic class using at least one of: a probability distribution technique and traffic pattern recognition techniques. Examples of probability distribution technique may include, but are not limited to, Levy, Cauchy, Pareto, Weibull and Lognormal. The pcap files associated with refined network packets are fitted into one or more distribution techniques as exemplified above. Further the parameters of the distribution are used as distribution features. In addition to feature extraction using probability distribution, the feature extraction unit 122 is configured to analyze the traffic patterns associated with each of the plurality of anomaly classes and extract features associated with respective anomaly classes using traffic pattern recognition techniques. Additionally, the feature extraction unit 122 is configured to extract features from the user logs and audit reports associated with user behavior anomaly classes. In an exemplary embodiment of the present invention, the features extracted for the user behavior anomalies include, but are not limited to, user login time, user logout time, user session login time, user session logout time and user executed command. FIG. 1C is an exemplary table of various features extracted for network anomalies and user anomalies.

In an embodiment of the present invention, the identification unit 124 is configured to receive the extracted plurality of feature values associated with the refined first collection of one or more datasets from the feature extraction unit 122. Further, the identification unit 124 is configured to determine a generic pattern of behavior associated with the plurality of anomaly classes. The generic pattern is fixed as a boundary for each of the plurality of anomaly classes and is representative of behavior which substantially simulates the network behavior (feature value) on attack by any of the plurality of anomaly classes. In an embodiment of the present invention, the feature values associated with respective anomaly classes are individually analyzed and a pattern specific to respective anomaly class is determined using the corresponding features values. The generic pattern of behavior associated with the plurality of anomaly classes is evaluated from the individual patterns of anomalies. In an embodiment of the present invention, the identification unit 124 uses a deep learning technique to determine the generic pattern of behavior associated with the plurality of anomaly classes. In an exemplary embodiment of the present invention, the identification unit 124 uses Deep Q Learning (DQN) based Reinforcement Learning technique on the extracted features of each of the network traffic files and user behavior files. In an embodiment of the present invention, the identification unit 124 is integrated with a Q learning tool (not shown). The Q learning tool is configured to learn from the extracted features and perform an action of identification on the files included in the datasets to determine generic pattern of behavior associated with the plurality of anomaly classes.

The identification unit 124 is configured to define rewards for the Q learning tool for each correct identification action. In an exemplary embodiment of the present invention, the identification unit 124 is configured to define a positive reward for each correct identification action, and a negative reward for each incorrect identification action. Further, the identification unit 124 is configured to define an immediate reward and a delayed reward within each of the positive and negative rewards. In an exemplary embodiment of the present invention, an immediate reward is representative of a reward on immediate response by a user on receiving an anomaly identification alert. The delayed response is representative of a reward on a delayed response by a user on receiving an anomaly identification alert. The immediate and delayed response may be positive or negative based on correctness of identification. Further, the identification unit 124 is configured to observe the current reward, cumulative reward, and current state, reset the environment (where parameters are initialized and machine learning techniques are executed for prediction), update the environment and get the next state. In an embodiment of the present invention, the identification unit 124 maintains the previous state transitions (experiences) such as current state, action, reward, next state and last transition in the memory 116 or some external memory (not shown). In operation, the identification unit 124 defines one or more parameters of the Q-learning tool. The one or more parameters may include, but are not limited to, number of actions, learning rate, discount factor and maximum memory for the Q-learning tool. In another embodiment of the present invention, the one or more parameters are defined by a user via the I/O terminal device 110. In an exemplary embodiment of the present invention, the number of actions are two, which include identifying the dataset as normal and identifying the dataset as abnormal. The learning rate is selected as 0.001. The discount factor is selected such as to provide a trade-off between immediate reward and delayed reward on correct identification by the Q-learning tool. Further, the features extracted from respective network traffic files or user behavior files (user logs) associated with at least one anomaly class or a normal class are labeled as abnormal or normal by using supervised learning. In an embodiment of the present invention, the extracted features are labeled by a user via the I/O terminal device 110. Furthermore, the pcap file or user logs having labelled features are fed as an input to the Q learning tool. The Q-learning tool is configured to randomly perform an identification action on the fed files (pcap file or user logs), and fed files (pcap file or user logs) are identified as normal or abnormal based on the features associated with said files. The identification unit 124 is configured to evaluate the random action of Q-learning tool based on the provided labels. The identification unit 124 provides a positive reward if the random action is same as the label and a negative reward if the random action is not same as the label. Yet further, total cumulative reward is computed based on the total number of correct actions for the plurality of files (pcap files/user logs) of respective anomaly classes in the first collection of one or more datasets. The individual pattern specific to respective anomaly classes is evaluated based on the feature values associated with said anomaly classes. Finally, the generic pattern of behavior associated with the plurality of anomaly classes is evaluated from the individual pattern of anomalies and features (values) associated with respective anomaly classes. As already explained above, the generic pattern is fixed as a boundary for each of the plurality of anomaly classes and is representative of behavior or feature value which substantially simulates the network behavior or feature value on attack by any of the plurality of anomaly classes. In another embodiment of the present invention, individual generic patterns are determined for plurality of network anomaly classes and user behavior anomalies.

In an embodiment of the present invention, the identification unit 124 is configured to analyze the performance of the generic pattern and update the generic pattern based on the second collection of one or more datasets using a second set of rules. In an embodiment of the present invention, the second set of rules comprises refining second collection of one or more datasets by the identification unit 124 using the first set of rules via the data segmentation unit 120. The second set of rules further includes extracting the plurality of feature values associated with the predetermined features from a plurality of files included in the second collection of one or more datasets. In particular, feature values associated with each of the pcap files/user logs included in the second collection of one or more datasets are extracted by the identification unit 124 via the feature extraction unit 122. Further, the second set of rules includes feeding the files included in the second collection of one or more datasets as an input to the Q learning tool. The Q-learning tool analyses the plurality feature values associated with each file (pcap files/user logs) and performs an identification action on each of the fed files (pcap files/user logs) of second collection and identifies the fed files (pcap file or user logs) as normal or abnormal by analyzing the feature values using reinforcement learning. Further, the second set of rules includes evaluating the action of Q-learning tool based on the generated generic pattern and generating rewards for each correct identification action. Further, the identification unit 124 is configured to update the generic pattern based on the generated cumulative rewards, where the cumulative awards are generated based on the total number of correct actions for the plurality of files of respective anomaly classes in the second collection of one or more datasets.

Finally, identification unit 124 is configured to detect anomalous behavior in the network based on updated generic pattern using a third set of rules. In an embodiment of the present invention, the third set of rules comprises receiving network traffic in real time from the network of devices 106 of FIG. 1. The third set of rules further comprises refining the incoming real-time traffic using the first set of rules via the data segmentation unit 120. Refining the incoming real-time traffic comprises categorizing a plurality of files included in the real-time traffic into network traffic files and user behavior files, segmenting into network packets and user logs, and processing to remove improper network packets and user logs. The processed network packets and user logs are arranged in a chronological order, respectively. The third set of rules further includes extracting a plurality of feature values associated with the predetermined features from each of the plurality of files (pcap files/user logs) included in the incoming real-time traffic. Further, the third set of rules includes feeding each of refined files (pcap files/user logs) included in the incoming real-time traffic as an input to the Q learning tool. The Q-learning tool is configured to perform an identification action on respective features associated with each of the refined files (pcap files/user logs) and identify fed pcap file or user logs as normal or abnormal using reinforcement learning. Further, the third set of rules includes evaluating the action of Q-learning tool based on the updated generic pattern and generating rewards for each correct identification action.

Further, the identification unit 124 is configured to generate a notification if the feature associated with a file is abnormal indicating that the file includes abnormal traffic. Additionally, the identification unit 124 is configured to further update the generic pattern based on cumulative rewards generated based on each correct notification.

Advantageously, the system of the present invention allows self-learning using reinforcement learning technique and thus minimizes user intervention. Further, the updated generic pattern of the present invention causes the system to identify zero-day attacks.

Figure 2:
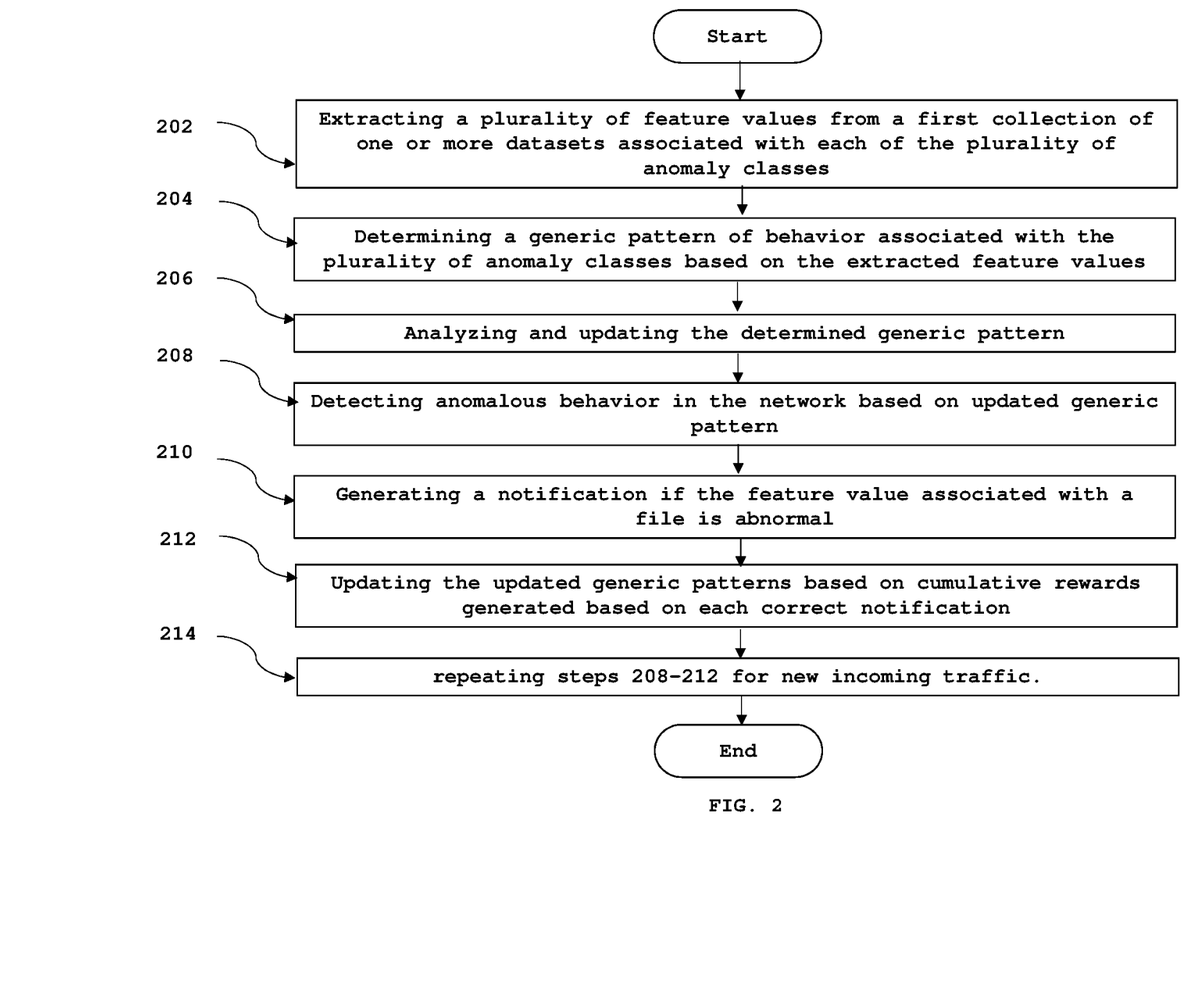
FIG. 2 is a flowchart illustrating a method for detecting anomalous behavior patterns in a network, in accordance with an embodiment of the present invention.

FIG. 2 is a flowchart illustrating a method for detecting anomalous behavior patterns in a network, in accordance with an embodiment of the present invention.

At step 202, a plurality of feature values associated with predetermined features are extracted from a first collection of one or more datasets associated with each of the plurality of anomaly classes. In an embodiment of the present invention, the features to be extracted are predetermined based on statistical analysis of network behavior in the presence and absence of network anomalies. In an embodiment of the present invention, a feature is an individual measurable characteristic of network behavior and user behavior in the presence or absence of an anomaly. In an embodiment of the present invention, the first collection of one or more datasets comprises heterogeneous data capable of simulating real traffic associated with each of the plurality of anomaly classes and normal behavior classes (as already described in para 19-21 of the specification). In operation, the first collection of one or more datasets is retrieved from the first database 102 of FIG. 1. The retrieved first collection of one or more datasets is refined using a first set of rules. In an embodiment of the present invention, the first set of rules comprises categorizing a plurality of files included in the first collection of one or more datasets into network traffic files (pcap files) and user behavior files. The network traffic files includes, data associated with network anomaly class and normal traffic class. The user behavior files includes, data associated with user behavior anomalies and normal user behavior. The first set of rules further comprises segmenting each of the categorized datasets. In particular, the network traffic files and the user behavior files are segmented into small chunks based on time of collection of data within the files. The segmentation is done using one or more techniques such as Long-Short-Term memory (LSTM) technique. In an exemplary embodiment of the present invention, where the network traffic files are pcap files, said pcap files are segmented into small chunks of network packets based on time of collection of the network packets. The user behavior files are segmented into small chunks of user logs based on the time of collection user logs. The first set of rules further includes removing improper datasets from the segmented datasets. In an exemplary embodiment of the present invention, improper dataset is a dataset without any metadata. In operation each network traffic file and each user behavior file is processed to remove improper data associated with each network file and each user behavior file. In particular, improper network packets and improper user logs are removed. Finally, the first set of rules includes, arranging each of the proper network packets and the proper user logs in chronological order.

Further, the plurality of feature values are extracted from plurality of network traffic files and user behavior files associated with the plurality of anomaly classes. The features associated with each network anomaly class and the features associated with user anomaly class are extracted from the refined datasets using one or more techniques. In operation, the plurality of feature values are extracted from each of refined network packets associated with at least one of: network anomaly class or a normal traffic class using at least one of: a probability distribution technique and traffic pattern recognition techniques. Examples of probability distribution technique may include, but are not limited to, Levy, Cauchy, Pareto, Weibull and Lognormal. The pcap files associated with refined network packets are fitted into one or more distribution techniques as exemplified above. Further the parameters of the distribution are used as distribution features. In addition to feature extraction using probability distribution, the traffic patterns associated with each of the plurality of anomaly classes are analyzed and features associated with respective anomaly classes are extracted using traffic pattern recognition techniques. Additionally, features from the user logs and audit reports associated with user behavior anomaly classes are extracted. In an exemplary embodiment of the present invention, the features extracted for the user behavior anomalies include, but are not limited to, user login time, user logout time, user session login time, user session logout time and user executed command. FIG. 1C is an exemplary table of various features extracted for network anomalies and user anomalies.

At step 204, a generic pattern of behavior associated with the plurality of anomaly classes is determined. In an embodiment of the present invention, the generic pattern of behavior associated with the plurality of anomaly classes is determined based on the plurality of feature values extracted from a first collection of one or more datasets associated with the plurality of anomaly classes. The generic pattern is fixed as a boundary for each of the plurality of anomaly classes and is representative of behavior which substantially simulates the network behavior (feature value) on attack by any of the plurality of anomaly classes. In an embodiment of the present invention, the feature values associated with respective anomaly classes are individually analyzed and a pattern specific to respective anomaly class is determined using the corresponding feature values. The generic pattern of behavior associated with the plurality of anomaly classes is evaluated from the individual pattern of anomalies. In an embodiment of the present invention, a deep learning technique is used to determine the generic pattern of behavior associated with the plurality of anomaly classes. In an exemplary embodiment of the present invention, a Deep Q Learning (DQN) based Reinforcement Learning technique is used on the extracted features of each of the network traffic files and user behavior files.

In an embodiment of the present invention, the Deep Q Learning (DQN) technique includes a Q learning tool (not shown). The Q learning tool is configured to learn from the extracted features and perform an action of identification on the files included in the datasets to determine generic pattern of behavior associated with the plurality of anomaly classes. In operation, rewards are defined for the Q learning tool for each correct identification action. In an exemplary embodiment of the present invention a positive reward is defined for each correct identification action, and a negative reward is defined for each incorrect identification action. Further, immediate rewards and delayed rewards are defined within each of the positive and negative rewards. In an exemplary embodiment of the present invention, an immediate reward is representative of reward on immediate response by a user on receiving an anomaly identification alert. The delayed response is representative of reward on a delayed response by a user on receiving an anomaly identification alert. The immediate and delayed response may be positive or negative based on correctness of identification. Further, one or more parameters of the Q-learning tool are defined. The one or more parameters include, but are not limited to, number of actions, learning rate, discount factor and maximum memory for the Q-learning tool. In an embodiment of present invention, the one or more parameters may be defined by a user. In an exemplary embodiment of the present invention, the number of actions are two, which includes identifying the dataset as normal and identifying the dataset as abnormal. The learning rate is selected as 0.001. The discount factor is selected such as to provide a trade-off between an immediate reward and a delayed reward on correct identification by the Q-learning tool.

Further, the feature values extracted from respective network traffic files or user behavior files (user logs) associated with at least one of: anomaly class or a normal class are labeled as abnormal or normal by using supervised learning. In an embodiment of the present invention, the extracted features are labeled by a user via the I/O terminal device. Furthermore, the files (pcap file or user logs) having labeled features are fed as an input to the Q learning tool. A random identification action is performed by the Q-learning tool on the fed files (pcap file or user logs), and fed files (pcap file or user logs) are identified as normal or abnormal based on the features associated with said files. The random action of Q-learning tool is evaluated based on the provided labels. A positive reward is provided to the Q-learning tool if the random action is same as the label and a negative reward is provided if the random action is not same as the label. Yet further, total cumulative reward is computed based on the total number of correct actions for the plurality of files (pcap files/user logs) of respective anomaly classes in the first collection of one or more datasets. The individual pattern specific to respective anomaly classes is evaluated based on the feature values associated with said anomaly classes. Finally, the generic pattern of behavior associated with the plurality of anomaly classes is evaluated from the individual pattern of anomalies and features (values) associated with respective anomaly classes. As already explained above, the generic pattern is fixed as a boundary for each of the plurality of anomaly classes and is representative of behavior or feature value which substantially simulates the network behavior or feature value on attack by any of the plurality of anomaly classes. In another embodiment of the present invention, individual generic patterns are determined for plurality of network anomaly classes and user behavior anomalies.

At step 206, the performance of determined generic pattern is analyzed and the generic pattern is updated. In an embodiment of the present invention, the performance of the determined generic pattern is analyzed and updated based on a second collection of one or more datasets using a second set of rules. In an embodiment of the present invention, the second set of rules comprises refining second collection of one or more datasets using the first set of rules. Refining the second collection of one or more datasets using a first set of rules includes categorizing a plurality of files included in the second collection of one or more datasets into network traffic files and user behavior files, segmenting into network packets and user logs, and processing to remove improper network packets and user logs. The processed network packets and user logs are arranged in a chronological order, respectively.

The second set of rules further includes extracting the plurality of feature values associated with the predetermined features from a plurality of files included in the second collection of one or more datasets. Further, the second set of rules includes feeding the refined files included in the second collection of one or more datasets as an input to the Q learning tool. The Q-learning tool analyses the plurality features values of each file (pcap files/user logs) and performs an identification action on each of the fed files (pcap files/user logs) and identifies the fed files (pcap file or user logs) as normal or abnormal by analyzing the features using reinforcement learning. Further, the second set of rules includes evaluating the action of Q-learning tool based on the generated generic pattern and generating rewards for each correct identification action. Further, the determined generic pattern is updated based on the generated cumulative rewards. In an embodiment of the present invention, the cumulative awards are generated based on the total number of correct actions for the plurality of files of respective anomaly classes in the second collection of one or more datasets.

At step 208, anomalous behavior in the network is detected based on updated generic pattern. In an embodiment of the present invention, the anomalous behavior is detected using a third set of rules. In an embodiment of the present invention, the third set of rules comprises receiving network traffic in real-time from the network of devices 106 of FIG. 1. Refining the incoming real-time traffic using the first set of rules. Refining the incoming real-time traffic comprises categorizing a plurality of files included in the real-time traffic into network traffic files and user behavior files, segmenting into network packets and user logs, and processing to remove improper network packets and user logs. The processed network packets and user logs are arranged in a chronological order, respectively. The third set of rules further includes extracting a plurality of feature values associated with the predetermined features from each of the plurality of files (pcap files/user logs) included in the incoming real-time traffic. Further, the third set of rules includes feeding each of refined files (pcap files/user logs) included in the incoming real-time traffic as an input to the Q learning tool. The Q-learning tool is configured to perform an identification action on respective features associated with each of the refined files (pcap files/user logs) and identify fed pcap file or user logs as normal or abnormal using reinforcement learning. Further, the third set of rules includes evaluating the action of Q-learning tool based on the updated generic pattern and generating rewards for each correct identification action.

At step 210, a notification is generated if the feature value associated with a file is abnormal indicating that the file includes abnormal traffic. At step 212, the updated generic pattern is further updated based on cumulative rewards generated based on each correct notification. At step 214, repeating steps 208-212 for new incoming traffic.

Figure 3:
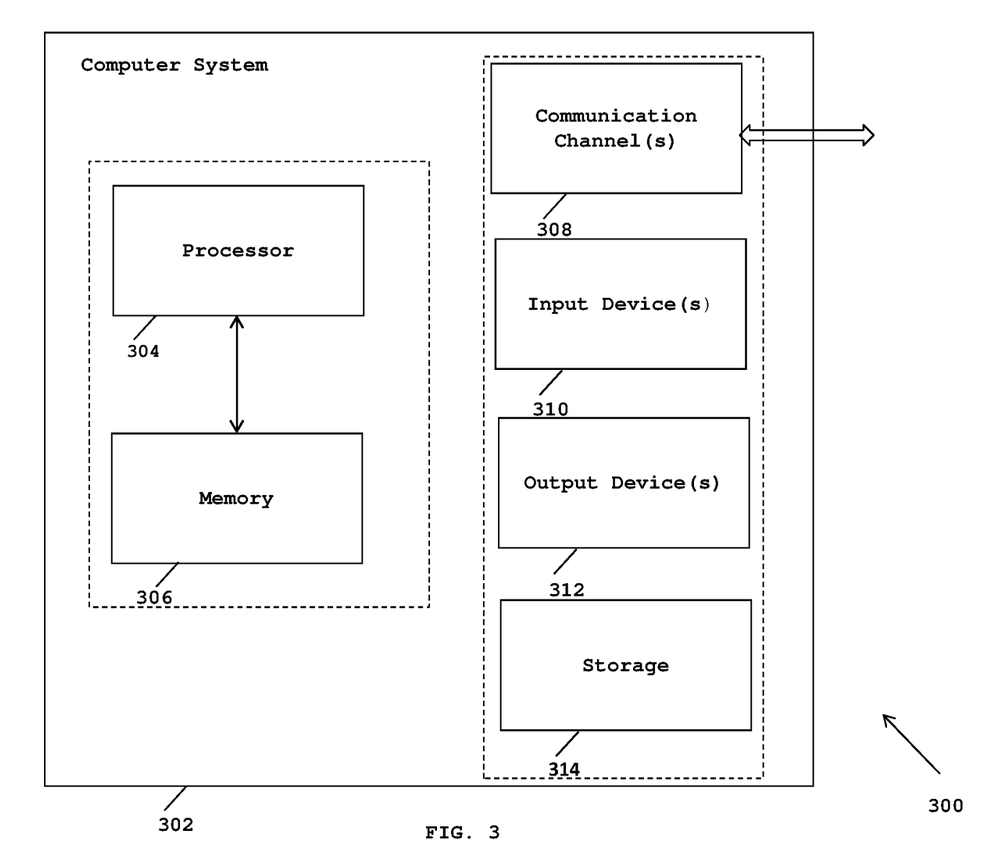
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for detecting anomalous behavior patterns in a network, wherein the method is implemented by at least one processor executing program instructions stored in a memory, the method comprising:

extracting, by the processor, a plurality of feature values associated with predetermined features from a first collection of one or more datasets associated with a plurality of anomaly classes, wherein the predetermined features are individual measurable characteristics of network behavior and user behavior in the presence or absence of an anomaly, and wherein extracting the plurality of feature values from the first collection of one or more datasets comprises refining the first collection of one or more datasets using a first set of rules and using at least one of: a probability distribution technique and traffic pattern recognition techniques on the refined first collection of one or more datasets to extract the plurality of feature values;

determining, by the processor, a generic pattern of behavior associated with the plurality of anomaly classes based on the extracted feature values, wherein the generic pattern is representative of behavior which substantially simulates feature values on attack by any of the plurality of anomaly classes;

updating, by the processor, the determined generic pattern based on the analysis of performance of the determined generic pattern based on a second collection of one or more datasets associated with the plurality of anomaly classes and normal behavior classes; and detecting, by the processor, anomalous behavior pattern in a real-time traffic based on the updated generic pattern.

2. The method as claimed in claim 1, wherein, a notification indicating abnormal traffic is generated if the feature values associated with the real-time traffic is abnormal.

3. The method as claimed in claim 2, wherein the updated generic pattern is further updated based on cumulative rewards generated based on each correct notification.

4. The method as claimed in claim 1, wherein the first set of rules comprises:

categorizing a plurality of files included in the first collection of one or more datasets into network traffic files and user behavior files, wherein the network traffic files include data associated with network anomaly class and normal traffic class, and the user behavior files include data associated with user behavior anomalies and normal user behavior;

segmenting each of the categorized datasets, wherein the network traffic files and the user behavior files are segmented into small chunks network packets and user logs respectively based on time of collection of data within the files using Long-Short-Term memory (LSTM) technique;

removing improper datasets from the segmented datasets, wherein each of the network traffic file and each of the user behavior file is processed to remove improper network packets and improper user logs respectively; and arranging the network packets and the user logs in a chronological order.

5. The method as claimed in claim 4, wherein the plurality of feature values associated with network anomaly classes are extracted from each of refined network packets, using a probability distribution technique and traffic pattern recognition techniques, wherein the network traffic files associated with the refined network packets are fitted into one or more probability distribution techniques, and the parameters of the distribution are used as distribution features.

6. The method as claimed in claim 5, wherein the probability distribution technique is selected from a group of Levy, Cauchy, Pareto, Weibull and Lognormal.

7. The method as claimed in claim 4, wherein the features extracted for the user behavior anomalies include user login time, user logout time, user session login time, user session logout time and user executed command.

8. The method as claimed in claim 1, wherein determining the generic pattern of behavior comprises:
   labeling the extracted plurality of feature values for each of a plurality of network traffic files and user behavior files included in the first collection of one or more datasets as abnormal or normal using supervised learning;
   feeding each file with labeled features as an input to a deep Q learning technique;
   identifying the fed files as normal or abnormal based on the feature values by performing a random identification action on the fed files using the deep Q learning technique, wherein the random identification action is evaluated based on the labeling, wherein a positive reward is provided if the random action is same as the label and a negative reward is provided if the random action is not same as the label, and computing a total cumulative reward based on the total number of correct actions for the plurality of files of respective anomaly classes in the first collection of one or more datasets; and
   evaluating individual patterns for respective anomaly classes based on identification of fed files, and determining the generic pattern of behavior associated with the plurality of anomaly classes from the individual pattern of anomaly classes and feature values associated with respective anomaly classes, the generic pattern is fixed as a boundary for each of the plurality of anomaly classes.

9. The method as claimed in claim 1, wherein updating and analysis of the determined generic pattern is performed using a second set of rules, wherein the second set of rules comprises:
   refining the second collection of one or more datasets, wherein a plurality of files included in the second collection of one or more datasets are categorized into network traffic files and user behavior files, segmented into network packets and user logs, and processed to remove improper network packets and user logs, wherein the processed network packets and user logs are arranged in a chronological order respectively;
   extracting a plurality of feature values associated with the predetermined features from the plurality of files included in the second collection of one or more datasets;
   identifying the feature values associated with each file included in the second collection of one or more datasets as normal or abnormal by analyzing the plurality of extracted feature values based on the determined generic pattern using reinforcement learning, wherein each file included in the second collection of one or more datasets is fed as an input to a deep Q learning technique;
   evaluating each identification action based on the determined generic pattern and generating rewards for each correct identification action; and
   updating the generic pattern based on cumulative rewards generated based on the total number of correct actions for the plurality of files of respective anomaly classes in the second collection of one or more datasets.

10. The method as claimed in claim 1, wherein anomalous behavior pattern in the network is detected by analyzing the real-time traffic using a third set of rules, wherein the third set of rules comprises:
    refining the incoming real-time traffic, wherein a plurality of files included in the real-time traffic are categorized into network traffic files and user behavior files, segmented into network packets and user logs, and processed to remove improper network packets and user logs, wherein the processed network packets and user logs are arranged in a chronological order respectively;
    extracting a plurality feature values associated with the predetermined features from each of the plurality of files included in the incoming real-time traffic;
    identifying the respective feature values of the refined files as normal or abnormal by analyzing the extracted plurality of feature values based on the updated generic pattern using reinforcement learning, wherein each of refined files included in the incoming real-time traffic is fed as an input to a deep Q learning technique; and
    evaluating each identification action based on the updated generic pattern and generating rewards for each correct identification action.

11. A system for detecting anomalous behavior patterns in a network, the system comprising:
    a memory storing program instructions; a processor configured to execute program instructions stored in the memory; and an anomaly detection engine in communication with the processor and configured to:
    extract a plurality of feature values associated with predetermined features from a first collection of one or more datasets associated with a plurality of anomaly classes, wherein the predetermined features are individual measurable characteristics of network behavior and user behavior in the presence or absence of an anomaly, and wherein extracting the plurality of feature values from the first collection of one or more datasets comprises refining the first collection of one or more datasets using a first set of rules and using at least one of: a probability distribution technique and traffic pattern recognition techniques on the refined first collection of one or more datasets to extract the plurality of feature values;
    determine a generic pattern of behavior associated with the plurality of anomaly classes based on the extracted feature values, wherein the generic pattern is representative of behavior which substantially simulates feature values on attack by any of the plurality of anomaly classes;
    update the determined generic pattern based on the analysis of performance of the determined generic pattern based on a second collection of one or more datasets associated with the plurality of anomaly classes and normal behavior classes; and
    detect anomalous behavior pattern in a real-time traffic based on the updated generic pattern.

12. The system as claimed in claim 11, wherein, a notification indicating abnormal traffic is generated if the feature values associated with the real-time traffic is abnormal.

13. The system as claimed in claim 11, wherein the updated generic pattern is further updated based on cumulative rewards generated based on each correct notification.

14. The system as claimed in claim 11, wherein the anomaly detection engine comprises a data segmentation unit in communication with the processor, said data segmentation unit configured to refine the first collection of datasets, second collection of one or more datasets and the incoming real-time traffic using a first set of rules, wherein the first set of rules comprises
   a. categorizing a plurality of files included in the first collection of one or more datasets into network traffic files and user behavior files, wherein the network traffic files include data associated with network anomaly class and normal traffic class, and the user behavior files include data associated with user behavior anomalies and normal user behavior;
   b. segmenting each of the categorized datasets, wherein the network traffic files and the user behavior files are segmented into small chunks network packets and user logs respectively based on time of collection of data within the files using Long-Short-Term memory (LSTM) technique;
   c. removing improper datasets from the segmented datasets, wherein each of the network traffic file and each of the user behavior file is processed to remove improper network packets and improper user logs respectively;
   d. arranging the network packets and the user logs in a chronological order; and
   e. repeating steps a-d for the second collection of one or more datasets and the incoming real-time traffic.

15. The system as claimed in claim 14, wherein the anomaly detection engine comprises a feature extraction unit in communication with the processor, said feature extraction unit configured to extract the plurality of feature values associated with network anomaly classes from each of the refined network packets, using a probability distribution technique and a traffic pattern recognition techniques, wherein the network traffic files associated with the refined network packets are fitted into one or more probability distribution techniques, and the parameters of the distribution are used as distribution features.

16. The system as claimed in claim 14, wherein the features extracted for the user behavior anomalies include user login time, user logout time, user session login time, user session logout time and user executed command.

17. The system as claimed in claim 11, wherein the anomaly detection engine comprises an identification unit in communication with the processor, said identification unit configured to determine the generic pattern of behavior by:
   labeling the extracted plurality of feature values for each of a plurality of network traffic files and user behavior files included in the first collection of one or more datasets as abnormal or normal using supervised learning;
   feeding each file with labeled features as an input to a deep Q learning technique;
   identifying the fed files as normal or abnormal based on the feature values by performing a random identification action on the fed files using the deep Q learning technique, wherein the random identification action is evaluated based on the labeling, wherein a positive reward is provided if the random action is same as the label and a negative reward is provided if the random action is not same as the label, and computing a total cumulative reward based on the total number of correct actions for the plurality of files of respective anomaly classes in the first collection of one or more datasets; and
   evaluating individual patterns for respective anomaly classes based on identification of fed files, and determining the generic pattern of behavior associated with the plurality of anomaly classes from the individual pattern of anomaly classes and feature values associated with respective anomaly classes, the generic pattern is fixed as a boundary for each of the plurality of anomaly classes.

18. The system as claimed in claim 11, wherein the anomaly detection engine comprises an identification unit in communication with the processor, said identification unit configured to analyze performance of the determined generic pattern and update said generic pattern using a second set of rules, wherein the second set of rules comprises:
   refining the second collection of one or more datasets, wherein a plurality of files included in the second collection of one or more datasets are categorized into network traffic files and user behavior files, segmented into network packets and user logs, and processed to remove improper network packets and user logs, wherein the processed network packets and user logs are arranged in a chronological order respectively;
   extracting a plurality of feature values associated with the predetermined features from the plurality of files included in the second collection of one or more datasets;
   identifying the feature values associated with each file included in the second collection of one or more datasets as normal or abnormal by analyzing the plurality of extracted features based on the determined generic pattern using reinforcement learning, wherein each file included in the second collection of one or more datasets is fed as an input to a deep Q learning technique;
   evaluating each identification action based on the determined generic pattern and generating rewards for each correct identification action; and
   updating the generic pattern based on cumulative rewards generated based on the total number of correct actions for the plurality of files of respective anomaly classes in the second collection of one or more datasets.

19. The system as claimed in claim 11, wherein the anomaly detection engine comprises an identification unit in communication with the processor, said identification unit configured to detect anomalous behavior pattern in the network by analyzing real-time traffic using a third set of rules, wherein the third set of rules comprises:
   refining the incoming real-time traffic, wherein a plurality of files included in the real-time traffic are categorized into network traffic files and user behavior files, segmented into network packets and user logs, and processed to remove improper network packets and user logs, wherein the processed network packets and user logs are arranged in a chronological order respectively;
   extracting a plurality feature values associated with the predetermined features from each of the plurality of files included in the incoming real-time traffic;
   identifying the respective feature values of the refined files as normal or abnormal by analyzing the extracted plurality of feature values based on the updated generic pattern using reinforcement learning, wherein each of refined files included in the incoming real-time traffic is fed as an input to a deep Q learning technique; and evaluating each identification action based on the updated generic pattern and generating rewards for each correct identification action.

20. A computer program product comprising:

a non-transitory computer-readable medium having computer-readable program code stored thereon, the computer-readable program code comprising instructions that, when executed by a processor, cause the processor to:

extract a plurality of feature values associated with predetermined features from a first collection of one or more datasets associated with a plurality of anomaly classes, wherein the predetermined features are individual measurable characteristics of network behavior and user behavior in the presence or absence of an anomaly, and wherein extracting the plurality of feature values from the first collection of one or more datasets comprises refining the first collection of one or more datasets using a first set of rules and using at least one of: a probability distribution technique and traffic pattern recognition techniques on the refined first collection of one or more datasets to extract the plurality of feature values;

determine a generic pattern of behavior associated with the plurality of anomaly classes based on the extracted feature values, wherein the generic pattern is representative of behavior which substantially simulates feature values on attack by any of the plurality of anomaly classes;

update the determined generic pattern based on the analysis of performance of the determined generic pattern based on a second collection of one or more datasets associated with the plurality of anomaly classes and normal behavior classes; and detect anomalous behavior pattern in a real-time traffic based on the updated generic pattern.

* * * * *